United States Patent [19]

Gough

[11] Patent Number: 4,664,251

[45] Date of Patent: May 12, 1987

[54] ELEVATING CONVEYOR

[75] Inventor: George T. Gough, Newcastle, England

[73] Assignee: Gough & Company (Hanley) Limited, England

[21] Appl. No.: 738,600

[22] Filed: May 28, 1985

[30] Foreign Application Priority Data

May 29, 1984 [GB] United Kingdom ............... 8413565
Jun. 29, 1984 [GB] United Kingdom ............... 8416583

[51] Int. Cl.$^4$ ............................................. B65G 15/24
[52] U.S. Cl. ................................. 198/607; 198/836; 198/841
[58] Field of Search ............... 198/628, 836, 841, 607, 198/861.5, 860.3, 318

[56] References Cited

U.S. PATENT DOCUMENTS

| | | | |
|---|---|---|---|
| 1,854,560 | 4/1932 | Owens et al. | 198/860.3 |
| 2,167,818 | 8/1939 | Wagner | 198/836 X |
| 2,221,236 | 11/1940 | Gay, Jr. | 198/836 |
| 2,286,250 | 6/1942 | Albertoli | 198/607 |
| 2,759,591 | 8/1956 | Erickson | 198/318 X |
| 3,300,028 | 1/1967 | Landrey et al. | 198/607 X |
| 3,319,776 | 5/1967 | Bechtloff et al. | 198/628 |
| 3,339,710 | 9/1967 | Micgielse et al. | 198/836 X |
| 3,561,907 | 2/1971 | Campbell . | |
| 3,762,534 | 10/1973 | Beresinsky | 198/627 |
| 4,170,290 | 10/1979 | Frisbie et al. | 198/836 X |
| 4,222,482 | 9/1980 | Kelley | 198/841 X |
| 4,225,034 | 9/1980 | Sarovich | 198/607 |
| 4,382,502 | 5/1983 | Beresinsky | 198/628 |
| 4,457,422 | 7/1984 | Hurd | 198/628 X |
| 4,585,118 | 4/1986 | Plaut | 198/607 X |

FOREIGN PATENT DOCUMENTS

| | | | |
|---|---|---|---|
| 628358 | 5/1963 | Belgium | 198/860.3 |
| 2418156 | of 0000 | Fed. Rep. of Germany . | |
| 1120978 | 12/1961 | Fed. Rep. of Germany . | |
| 2631643 | 5/1978 | Fed. Rep. of Germany . | |
| 2717100 | 10/1978 | Fed. Rep. of Germany . | |
| 944102 | 12/1963 | United Kingdom . | |
| 969429 | 9/1964 | United Kingdom . | |
| 1513992 | 6/1978 | United Kingdom . | |
| 368138 | 1/1973 | U.S.S.R. | 198/628 |

Primary Examiner—Joseph E. Valenza
Assistant Examiner—Jonathan D. Holmes
Attorney, Agent, or Firm—Silverman, Cass, Singer and Winburn, Ltd.

[57] ABSTRACT

An elevating conveyor having a first endless belt entrained around a plurality of spaced support or guide drums for elevating material through an elevating section to a discharge station and a second endless loading belt also entrained around guide drums to cooperate with the first belt at least where a loading station and the elevating section merge so that in this vicinity the belts are in overlying relationship with each other so that material on the upper surface of one belt is held on the surface by the other belt. The two belts are moved at similar speeds in the same direction and a fixed plate cooperates with the first belt in the elevating section so that material located between the belt and plate is elevated to the discharge station by upward movement of the first belt through the elevating section. The conveyor may be of C, L or Z shape and the first belt preferably has upstanding side walls, the top faces of which bear against low friction material supported on the plate.

10 Claims, 4 Drawing Figures

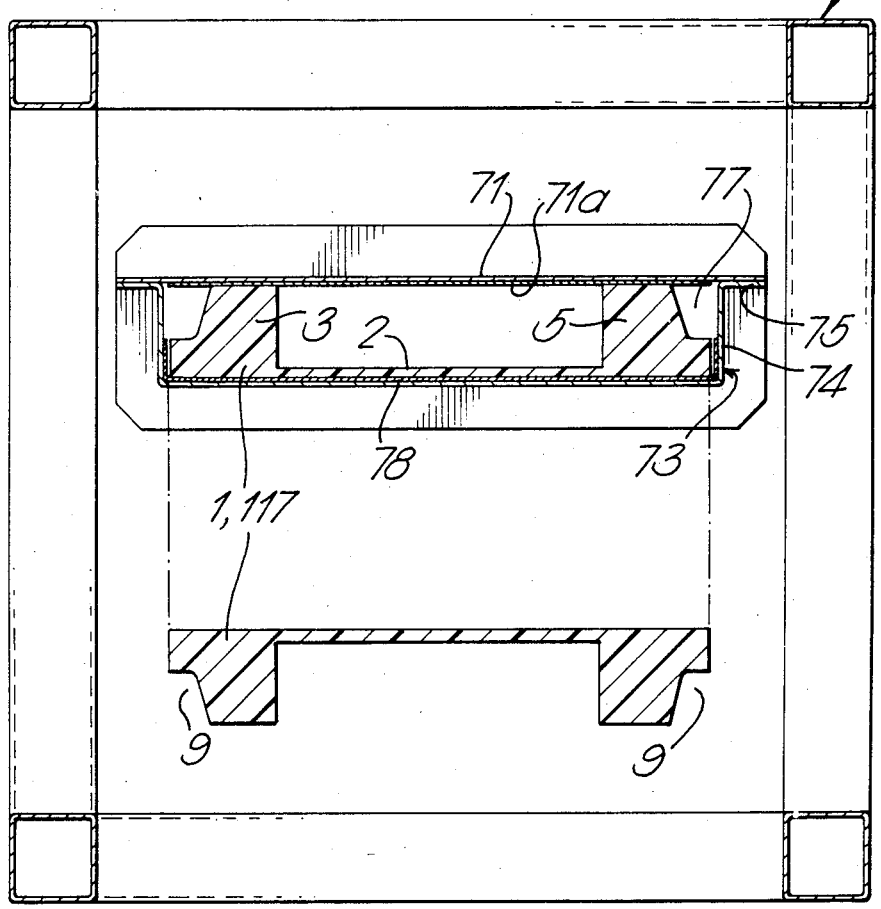

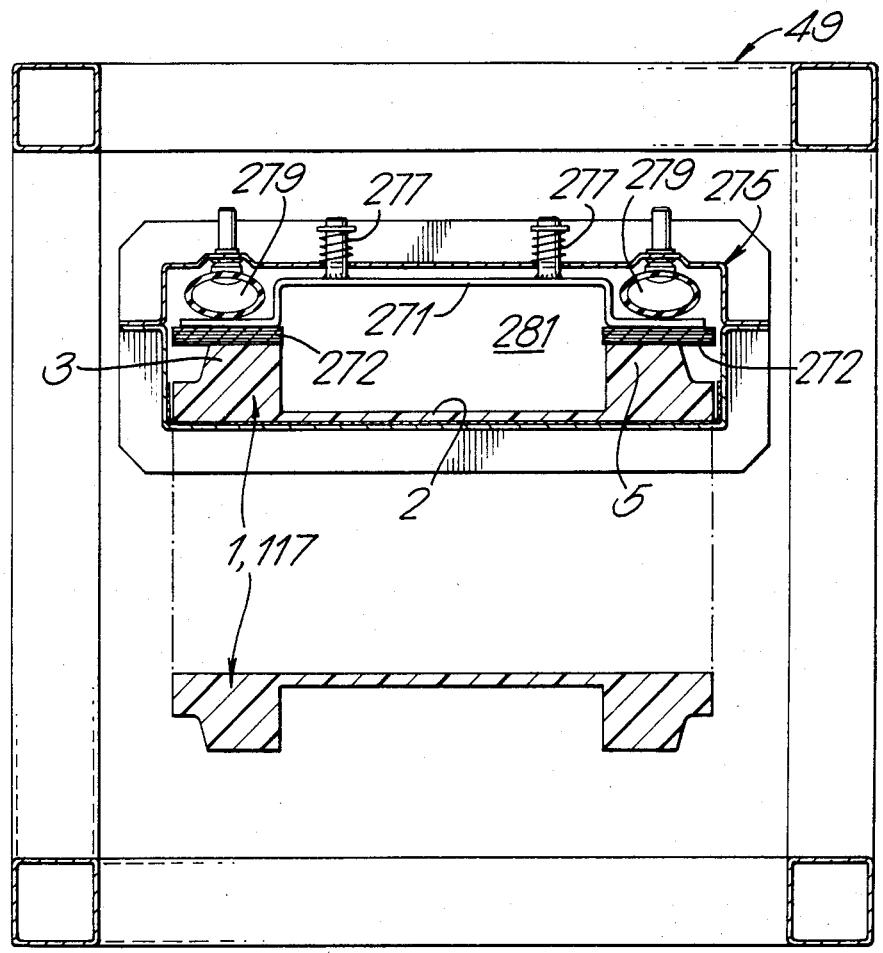

ELEVATING CONVEYOR

This invention relates to an elevating conveyor for granular, powdered or like material. To conveyor would, for example, be suitable for handling granular materials such as sugar or grain, or a powdered material such as cement or flour, or a material such as sand or a sand/gravel mixture, or coal which could be at least partially crushed. Furthermore, the conveyor could have many uses in the food, chemical and other industries.

It is well known to convey materials such as those described above from a first location to a second location which may be vertically spaced or indeed substantially vertically above the first location by confining the material between two endless belt runs which are moving in the same direction and at the same speed, or between one run of an endless belt and a fixed plate or casing. The belt or belts may have many different constructions and can either be supported so as to have a generally dished configuration when viewed in cross-section (see U.K. Pat. No. 1513992 or U.K. Pat. No. 944102) or alternatively, at least one of the belts may be provided with upstanding side walls so as to confine material supported by the belt and at least substantially prevent spillage of the material over the side edges of the belt (see U.K. Pat. No. 969429 and German DAS No. 1120978). The belt itself may be formed of a resiliently deformable rubber or plastics material and the surface of the belt on which the material to be conveyed is supported may be plain and smooth such as, for example, as disclosed in the German DAS No. 1120978 or it may be provided with transverse ribs such as are disclosed in the said U.K. Pat. Nos. 969429 and 944102. These transverse ribs may take different forms but instead of providing ribs, the belt may have a working face which is provided with a pattern of spaced and staggered projecting nubs such as are disclosed in U.S. Pat. No. 3,561,907. In German Specification OLS No. 2717100, two co-operating belts are disclosed, the lower one of which is supported on suitable guide rollers so as to give it a generally dish-shaped cross-section and the upper one of which has longitudinally extending side wall portions extending from the belt surface and transverse bars projecting from the belt surface. This belt is capable of conveying materials vertically.

A somewhat similar conveyor is disclosed in German OLS No. 2631643 and a yet further construction which relies upon a reduced pressure between the belts to hold the belts together is disclosed in German OLS No. 2418156. A yet further construction is disclosed in U.S. Pat. No. 3,762,534 wherein two plain belts are used to elevate material vertically, and the material is held between the belts by applying fluid pressure, e.g. air at a high pressure, to the opposite outer faces of the belts.

Rubber and PVC belting is now well known and is commercially available with different cross-sectional shapes. It is now quite common to provide lateral spilledges on PVC belting and these spilledges can merely be upstanding flanges which can have a rectangular, square, round, generally V-shaped or any other required profile. Furthermore, these edges may have a generally corrugated construction when viewed in plan so that the belts can withstand flexing over conveyor pulleys or drums of small diameter. What is more, if desired, projecting ribs can also or alternatively be provided on a lower side of the belt and typically these may have a V-shaped profile to assist with the tracking, i.e. guidance of the belt.

We have now devised an elevating conveyor which incorporates at least one endless belt which can be used to transfer material from one location to another, which locations may be vertically spaced, at high speed and which is suitable for even the most abrasive of material and has very few moving parts.

One of the problems with most, if not all, of the conveyors disclosed above, and similar conveyors of the twin belt type, is that they can only be operated at relatively low speeds. This is because they tend not to track satisfactorily because both belts tend to be entrained in superimposed relationship around the same pulleys or support drums. This means that, because the two belts will thus be moving through different radii of curvature, they in fact move at different speeds over the pulleys; in the case of movement over a pulley in one direction, belt A may be moving faster than belt B, but in the case of movement over a pulley in the opposite direction, i.e. change direction, belt B may be moving faster than belt A. However, the belts should always be in contact with each other to prevent material spillage, and this means therefore that there must be continuous relative belt movement. This can cause rapid belt wear due to friction, and means that such conveyors cannot be operated at high speed.

The present invention seeks to overcome the problem mentioned above, and seeks to provide a conveyor that enables either vertical or low angle distribution of the materials based upon the angle of repose of the particles within the confine of the conveying chamber.

According to the present invention, we provide an elevating conveyor having a loading station, an elevating section, and a discharge station above the loading station, said conveyor comprising a first endless belt entrained around a plurality of spaced support drums or pulleys for elevating material from the loading station through the elevating section to the discharge station, and a second endless loading belt also entrained around guide pulleys or drums located so that said second belt at least assists in moving material from the loading station to the elevating section by means of part of its belt run co-operating with part of the belt run of said first belt, said first belt having a run extending through the elevating section of the conveyor and cooperating with a fixed plate extending generally parallel with the first belt run in the elevating section, with material located between the belt and the plate being elevated to the discharge station by vertical movement of the first belt through the elevating section.

In one embodiment of the invention the first belt has a run which passes through the loading station, and the second belt has a run extending from the loading station to the elevating section so that material on the upper surface of the first belt as it passes through the loading station is held on said surface by the run of the second belt extending to the elevating section, said second belt being arranged above the run of the first belt which passes through the loading station.

In an alternative embodiment, the first belt has a run extending only through the elevating section to the discharge station, and the second belt has a run extending through the loading station to the elevating section, the two belts co-operating just at the foot of the elevating section, and the second belt being located beneath the first belt.

Preferably in this construction, the first belt has a run which extends from the loading station to the foot of the elevating section.

If desired, the elevating section can be pivoted about a horizontal axis, thus allowing the height of the discharge station above the loading station to be altered. Also, the conveyor may be of a mobile construction.

Preferably, the first belt is a side-walled belt so that a generally rectangular area is defined by the first belt and the fixed plate, and preferably at its lower end, the plate co-operates with the second belt where it runs over an upper guide pulley or drum, so as to maintain material on the upper surface of the first belt. At this point, a transfer shoe may be provided.

In one arrangement, the plate has two low friction guide strips thereon, arranged parallel to each other, and which co-operate with top faces of the side walls of the first belt. Preferably, however, all of the plate is covered with low friction material.

Means may be provided to bias said top faces and low friction material or strips into contact with each other, but it is preferred that the first belt, in the elevating section, runs within an enclosure lined with low friction material, the plate forming one wall of the enclosure, which has a cross-section just sufficient to allow the first belt to slide therein.

Preferably, the conveyor is located in a casing, there being a first aperture in the casing for a delivery chute or like feed means for the loading station, and a second aperture in the casing for elevated material to be discharged from the discharge station.

Preferably, the second endless loading conveyor belt comprises a commercially available endless conveyor belt which may be provided on its surface facing the first belt with upstanding lateral guide strips.

It is preferred that the plate be removably secured to and form part of the enclosure, but it could be supported on the enclosure and movable towards and away from the enclosure under the control of biassing means. The first belt may be entrained in an L or C shape around the guide pulleys or drums and the material on the belt is discharged over a curved upper portion of the belt. Alternatively, the first belt may be entrained in a Z shape around the guide pulleys or drums and material on the belt is carried at the top of the elevating section on a generally horizontal or an upwardly inclined belt portion for subsequent discharge, the plate being extended over the generally horizontal or upwardly inclined belt portion to confine material on the belt until it reaches the discharge station.

The belt may have many different constructions, but preferably has upstanding side walls so as to define with the fixed plate a generally rectangular conveying area. The belt may have nubs or fixed flight bars on its surface, and the side walls may be corrugated.

In one construction, the side wall portions may have a generally rectangular cross-section, and could be from about 1⅛ inches (28 mm) to 1½ inches (38 mm) deep, and about 2 inches (52 mm) wide.

The side wall portions may have a plurality of longitudinal grooves in their otherwise generally flat top surface which gives such side wall portions, when viewed in cross-section, a castellated appearance. These grooves provide cooling air channels between portions of the top surface which co-operate with the plate and loading conveyor belt.

Alternatively, or additionally, the top surface of the side wall portions may be coated with a friction reducing material or formed of a low friction material. It is preferred, however, that the friction reducing material, e.g. two strips or a layer of TEFLON or the like, are provided on the plate only.

In some instances, wherever a belt is entrained to change a direction through 90° or thereabouts, it may be preferred to entrain the belt about two pulleys or drums which will successively change the belt direction in two steps of 45° or thereabouts. This will reduce friction and any heat build-up, and will reduce loads and pressures between superimposed belts at such locations.

Three embodiments of elevating conveyor in accordance with the present invention are now described by way of example with reference to the accompanying drawings, in which:

FIG. 3 is a horizontal section along the line III—III of FIGS. 1 and 2 through an elevating section of the conveyors shown in FIGS. 1 and 2, and FIG. 4 is a view similar to FIG. 3 but showing a third embodiment of conveyor.

Figure 1:
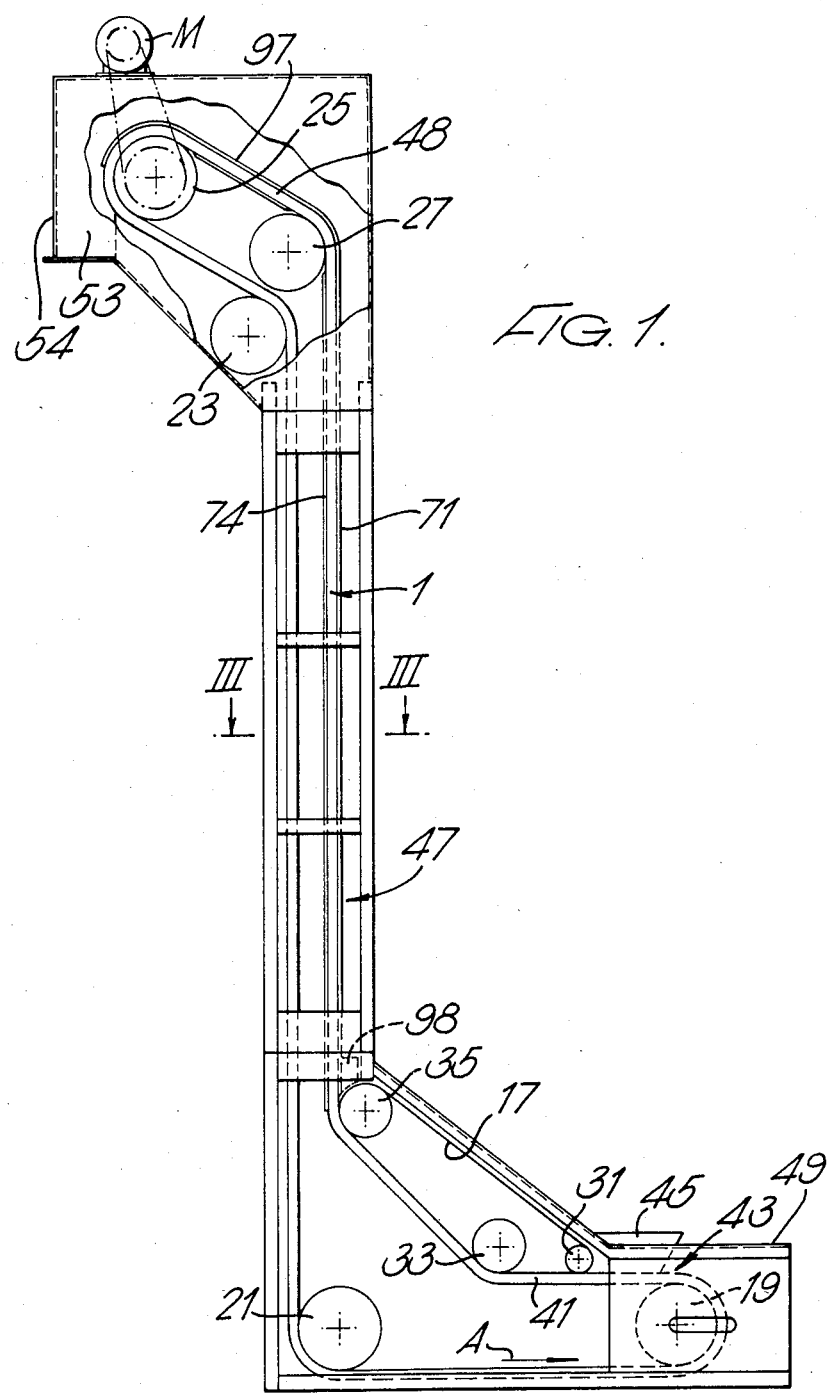
FIG. 1 is a schematic side elevation of a conveyor which has a single endless belt which is used for elevating, and a second loading belt at a loading station.

Referring to the drawings, an endless material carrying conveyor belt 1 has a load-carrying portion between two spaced side wall portions 3 and 5. The load-carrying portion is provided by a belting strip 2 which extends the full width of the belt and the portions 3, 5 are bonded to lateral top surface regions of the strip 2 in known manner; other means of connection could however be provided. Furthermore, the belt could have many other constructions; for example, the side walls may be of a different shape or they could be corrugated. The belt may be made of any known rubbery or plastics material(s), which may be reinforced, such as PVC, so that the wall portions 3, 5 may be heat sealed, adhered, galvanised, welded or secured in other known manner to the belting 2. The load-carrying portion of the belt may have a generally smooth planar upper or loadcarrying surface or, alternatively, transverse ribs or flight bars may be secured thereto at spaced locations. These ribs may take any known form and for some materials it is envisaged that the ribs could be replaced by a plurality of upstanding nubs.

Typically, the belt may be about 6 inches to 10 inches wide and the walls 3, 5 about 1½ inches wide and from about 1 inch to 1½ inches deep. It is however possible to have much wider belts than this in which case they may have to be supported on their underside over horizontal runs by suitable support rollers or slide plates. In order to prevent such belts from "bellying" inwards, the belt could be provided with spaced upstands between the side wall portions. Likewise, one or more longitudinal upstands could divide the loadcarrying part of the belt into two or more portions. As can be seen from FIG. 3 the side wall portions 3, 5 are both formed of approximately rectangular strips of material and the strips together with the belting strip 2 define a trough of generally rectangular crosssection for material to be conveyed. At an upper lateral edge region of each wall portion 3, 5 a recess 9 is provided to receive a lateral guide strip of a co-operating endless loading conveying belt 17 (see FIG. 1). This belt is of largely standard construction and is preferably also provided on its rear face with a central tracking strip of the same general cross-section as the lateral guide strips. The belts 1 and 17 are entrained around guide pulleys or drums as described hereinafter with reference to FIG. 1.

Referring now to FIG. 1, the single elevating belt 1 is entrained around a plurality of support drums or pulleys 19, 21, 23, 25 and 27. These pulleys have surfaces specially designed to accommodate the shape of the belt 1, but this forms no part of the present invention. The belt 17 is also entrained around guide pulleys 31, 33 and 35 and these pulleys are specially shaped and act as guides for the belt 1.

The drums or pulleys 33 and 19 are preferably arranged at appropriate levels so that an upper run 41 of the belt 1 extends generally horizontally so as to form part of a loading station 43 provided with a feed chute 45. The feed chute 45 is specially shaped for sealing engagement with the run 41 of the belt 1 and so as to form a seal with an overall casing 49 for the conveyor through which a first aperture is provided so that material can be loaded onto the belt 1 via the chute.

The drums 21, 23, 25, 27 and 35 are so arranged that the belt 1 has a generally vertical elevating run 47 followed by an inclined run 48 up to the drum 25 so that material on the belt 1 can be discharged over the drum 25 at a discharge station 53 and through a chute 54 making a second aperture in the casing 49.

As can be appreciated from FIG. 3, the drums 23, 31, 33 and 35 and preferably the others as well, have a special cross-section to receive the belts 1 and 17, but this forms no part of this invention.

Because the belts 1 and 17, as they are entrained around their various guide drums, move relative to each other, it is necessary to provide means where the two belts are superimposed to reduce belt wear and buildup of heat as a result of friction occurring due to the relative movement. Such means may be provided by a castellated surface to the face of wall portions 3, 5, or by a friction reducing coating, or by other means.

In the elevating section of the conveyor, the single belt 1 co-operates with a plate 71 which is provided with a low friction lining 71a against which the upper faces of the belt side walls 3 and 5 run (see also FIG. 3). In the construction shown in FIGS. 1-3, the belt runs against the lining 71a of the fixed plate 71, which forms part of an enclosure 73 for the belt, the remainder of the enclosure being made up of a shallow U-shaped plate 74 having flanges 75 with which the plate 71 is connected. This results in a generally rectangular space 77 snugly to receive the belt 1 in the elevating section, the plate 74 also having a low friction lining 78. This means that, as the belt 1 moves in the direction of arrow A in FIG. 1, it will carry material up the enclosure without spillage of material. At the bottom of the elevating section, a transfer shoe 98 is provided to prevent material being carried back to the loading station by the belt 17.

At its upper end, the plate 71 extends partly around the pulleys 27 and 25 so as to confine material on the belt 1, until it is discharged at 53, and at its lower end terminates at the transfer shoe 98, which is shaped to co-operate with the belt 17 on pulley 35.

Of course, different belt constructions can be used in conjunction with the plate 71. Alternatively, the plates 71 and 74 could be formed of a slippery material, in which case the linings 71a and 78 could be omitted.

When material to be elevated is introduced into the casing 49 through the chute 45, and falls on the belt 1 (the belt is driven—in direction of arrow A—by a motor M), the material will be carried by the belt 1, beneath the belt 17, and the two belts will then carry the material into the elevating section 47 of the conveyor. As the material emerges from the influence of the belt 17, so it will move upwardly and be confined against the belt 1 by the plate 71. The material will not slip back, due to the further advancing material between belts 1 and 17 (and/or to any means provided on the surface of belt 1), the belt 17 of course being driven at the same speed and in the same direction as the belt 1.

As shown, the conveyor is generally Z shaped. It could, however, be C shaped, in which case the run 48 would be replaced by a generally horizontal run extending in the opposite direction and overlying the run 41. The pulleys would have to be altered accordingly, and the wall 97 would be replaced by a horizontal run of the plate 71.

Figure 2:
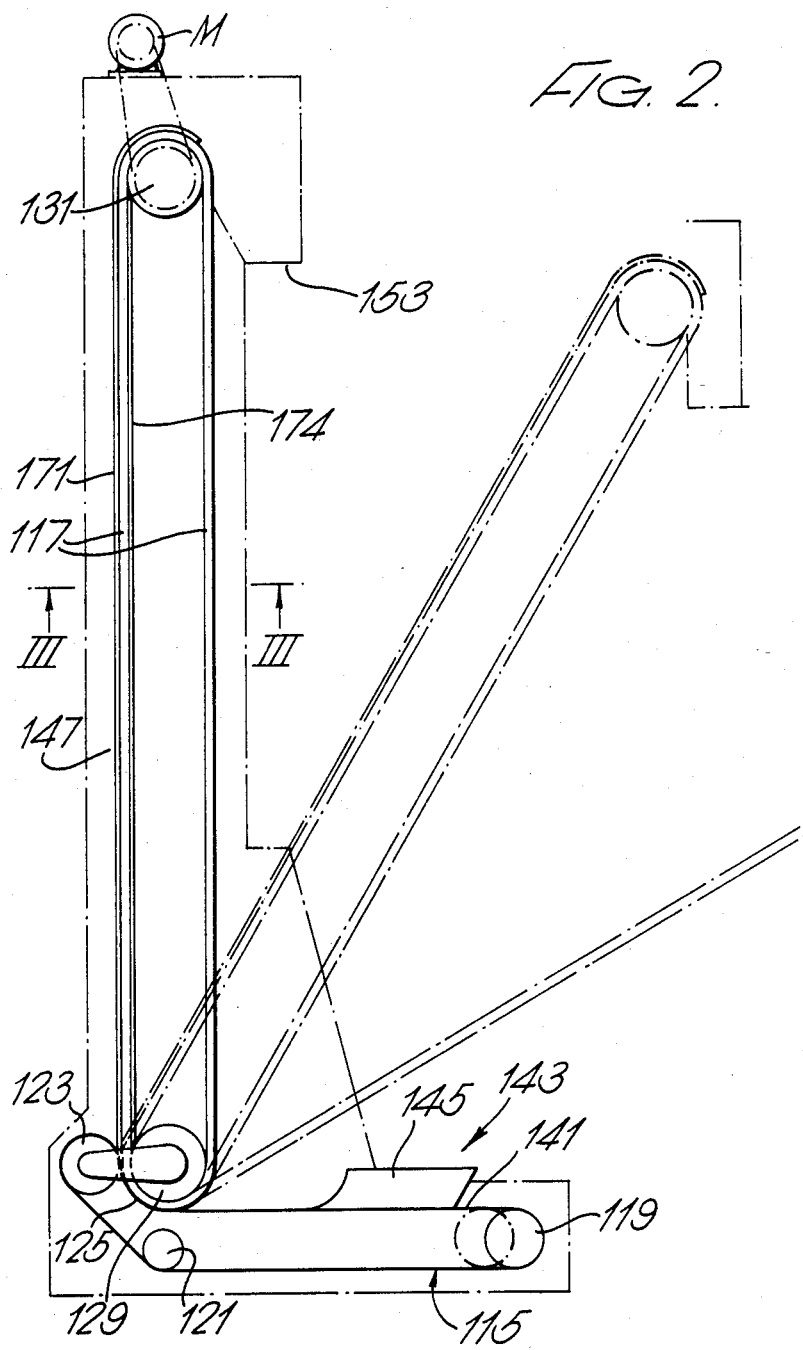
FIG. 2 is a view similar to FIG. 1 of an alternative embodiment of conveyor.

Referring now to FIG. 2, the elevating conveyor shown therein incorporates two endless belts 115 and 117 each of a different construction. Belt 115 is a belt similar to belt 17 and is entrained around three support drums or pulleys 119, 121 and 123, and at 125 is supported by the belt 117 where that belt is entrained around a special pulley or drum 129. The belt 117 is similar to the belt 1 shown in FIG. 1, i.e. it has two upstanding side walls, and is also entrained around a further special drum 131 and/or optionally, further pulleys or drums (not shown) to give the conveyor 9 C shape.

The bottom of drum 129 and top of drum 119 are preferably arranged at the same level so that an upper run 141 of the belt 115 extends generally horizontally so as to form part of a loading station 143 provided with a feed chute 145. The feed chute 145 is specially shaped for sealing engagement with the run 141 of the belt 115 and so as to form a seal with the curved portion of belt 117 when it is entrained around the drum 129.

The drums 129 and 131 are so arranged that the belt 117 has a generally vertical elevating run 147 (the elevating section) which may optionally be followed by an inclined run if further drums are provided, to give the conveyor a C shape.

Material on the belt 117 is discharged over the drum 131 at a discharge station 153.

As can be appreciated from FIG. 2, the drums 129 and 131 have a special cross-section to receive the side-walled belt 117, which may have a tracking rib-on its rear face. The drums 119, 121 and 123 are plain, to receive the belt 115 and hold it in position, although again there may be a suitable groove in the surface of these drums to receive a tracking rib, and if desired belt 115 may have upstanding side walls to co-operate with the belt 117.

The vertical run 147 of the belt 117 co-operates with a fixed plate 171 (see FIG. 2) in exactly the same way as the vertical run 47 of belt 1 of FIG. 1 co-operates with plate 71, in both cases the plate 71 or 171 being on the outside of the belt 1 or 117.

As can be seen in FIG. 2, the plate 171 is curved at its upper end so as to follow the general contour of the belt on the pulley 131 so as to guide material on the belt 117 up and around pulley 131 so that it can be discharged at 153.

The belt 117 at the bottom of the elevating section 147 can either just pass over pulley 129, or be entrained around further pulleys to give a generally horizontal belt run co-operating with run 141. This provides a lead-in channel to elevating section 147 for materials which have a small angle of repose.

If desired, the whole of the elevating section of the conveyor, including the plate 171 and plate 174, pulley 131, and discharge station 153, can have alternative positions represented by the broken lines in the Figure. These alternative positions can be fixed positions in which the conveyor is manufactured, or alternatively, the elevating section 147 can be pivotted about a horizontal axis corresponding to the rotational axis of the pulley 129. When the elevating section 147 is pivotted to one of its broken line positions illustrated, a swing arm is automatically swung clockwise (as seen in FIG. 2), carrying with it the pulley 123, so as to ensure the loading belt 115 will co-operate with the belt 117 until this latter co-operates with the plate 171. This movement of belt 115 and pulley 123 is permitted by mounting the pulley 119 for sliding movement towards and away from pulley 121 as shown by the broken line position of pulley 119. A pivotable conveyor means the conveyor can discharge at, or be designed to discharge at different heights and lateral locations which has obvious advantages. Also, it means that different materials can be conveyed with the elevating section at different angles, dependent upon the angle of repose of the material. Further, a pivotting elevating section has particular advantages since it means the whole conveyor can be made portable, e.g. mounted on wheels or a trailer chassis.

In the alternative construction shown in FIG. 4, instead of providing a fixed plate 71 or 171 forming part of the enclosure for the belt, a plate 271 is slidably supported on a wall of an overall casing 275 (as shown) and the belt 1 or 117 and plate 271 are biassed into engagement with one another so as to prevent spillage of material being conveyed in the elevating section over the side edges of the upstanding belt side walls. This bias may be provided by springs or rollers, but it is preferred that springs 277 hold the plate 271 and belt 1 or 117 apart, and two inflatable tubes 279 are provided which cause the side walls of the belt 1 or 117 to be pressed against low friction strips 272 on the plate 271. As can be seen from FIG. 4, the plate 271 is of shallow U shaped cross-section so as to define with the belt 1 or 117 a conveying channel 281 running totally within the overall casing 275. This plate could, however, be flat or concave or convex, or the casing 275 itself could co-operate with the belt 1 or 117, as shown in FIG. 3.

The belt 1 or 117 preferably has upstanding transverse space ribs thereon, or a plurality of upstanding nubs, but this is not essential. All powdered, granular or like materials when stock-piled have their own angle of repose and the conveyors of the present invention will operate satisfactorily and convey vertically without the provision of transverse ribs or upstanding nubs because at the loading stations the material being conveyed and which is supported on the horizontal run of the belt 1 or 117 will find its own angle of repose; the resultant frictional forces generated within the material in this horizontal run will be sufficient to support a column of the same material in the vertical run of the conveyor. Such properties are well known and are clearly relied upon for a satisfactory operation of many of the already known conveyors the subject of the prior specifications listed herein.

It will of course be appreciated that drive to the two conveyor belts, belt tensioning and other precise details of the component parts and the manner in which the various component parts of the conveyors are supported in their framework form no part of the present invention and accordingly these parts of the conveyors have not been described in detail.

The recesses are provided in the side walls of belt 1 or 117 to co-operate with the guide strips on the loading belt 17 or 115 to ensure satisfactory sealing and overlap of the two belts and give good tracking between the two belts. It is preferred to provide grooves in the top surfaces of the side walls so that there can be an airflow in the grooves which has a cooling effect when friction occurs when the two belts move relative to each other as they pass over their guide pulleys or drums (or the belt 1 or 117) moves over the plate 71 or 171). Furthermore, because the side walls are preferably formed of a soft rubbery material, a satisfactory seal between the co-operating belts is provided. In any event of course, when anti-friction material is provided between the two belts, this allows relative movement between the belts without undue friction occurring. By providing the side walls of a soft material or of a corrugated material, the belt 1 or 117 can negotiate small radii and what is more the depth of the load-carrying area can be quite significant.

Furthermore, because this relative slipping movement is permitted and there is no effective friction and hence wear, the whole elevating conveyor can be operated at high speed, e.g. at speeds of 300 ft. or more a minute.

In the above-described constructions, the belt 1 has a load-carrying portion which is formed in one part. However, this could be modified so as to be formed in two parts for central discharge.

It will of course be understood that the present invention has been described above purely by way of example, and modifications of detail can be made within the scope and spirit of the invention.

What is claimed is:

1. An elevating conveyor for bulk material and having a loading station, a discharge station above said loading station, and an elevating section extending between said loading and discharge stations; said conveyor comprising:

a plurality of spaced support pulleys including upper guide pulleys;

a first endless belt entrained around at least some of said support pulleys and having a run extending through said elevating section of said conveyor for elevating bulk material from said loading station through said elevating section to said discharge station;

a second endless loading belt also entrained around at least some of said guide pulleys and located so that said second belt assists in moving material from said loading station to said elevating section by means of part of its belt run cooperating with part of the belt run of said first belt;

a fixed plate having an upper and a lower end and extending generally parallel with said first belt run in said elevating section;

means on said first belt for defining side walls having top faces so that a generally rectangular area is defined by said first belt, said walls and said plate, and wherein at said lower end, said plate cooperates with said second belt where it runs over at least one of said guide pulleys, so as to maintain said material on the upper surface of said first belt;

two low friction areas on said plate in generally parallel relationship to one another, and with which areas said top faces of said side wall means of said first belt cooperate so that said material is located between said belt and said plate and is elevated to said discharge station by vertical movement of said first belt through said elevating section; and means for biasing said first belt and plate together, said plate being part of an overall enclosure for said first belt in said elevating section.

2. An elevating conveyor according to claim 1 wherein said first belt has a run which passes through said loading station and wherein said second belt has a run extending from said loading station to said elevating section so that material on the upper surface of said first belt, as it passes through said loading station, is held on said surface by said run of said second belt extending to said elevating section, said second belt being located above the run of said first belt which passes through said loading station.

3. An endless conveyor according to claim 1 wherein said low friction areas include two low friction guide strips mounted on said plate, said strips being parallel to each other, and said strips providing said areas cooperating with top faces of said side walls of said first belt.

4. An endless conveyor according to claim 1 wherein said plate has a low friction material coating on its surface, said areas forming part of said coating.

5. An endless conveyor according to claim 1 and including means supporting said plate on said enclosure and said plate being movable towards and away from said enclosure under the control of biasing means.

6. An endless conveyor according to claim 1 wherein said plate provides a wall of said overall enclosure in which enclosure said belt is snugly received for sliding movement therein, the remaining walls of said enclosure being coated with a low friction material.

7. An endless conveyor according to claim 1 and including means defining a first aperture in said overall enclosure, feed means for said loading station cooperating with said first aperture, and means defining a second aperture in said overall enclosure so that elevated material may be discharged from said discharge station.

8. An endless conveyor according to claim 1 wherein said first belt is entrained in a L shape around said guide pulleys and wherein material on said first belt is discharged over an upper portion of said belt entrained around an upper guide pulley.

9. An endless conveyor according to claim 1 wherein said first belt is entrained in a Z shape around said plurality of guide pulleys or drums and wherein material on said first belt is carried at the top of the elevating section on a generally horizontal or an upwardly inclined belt portion for subsequent discharge, said plate extending over said generally horizontal or upwardly inclined belt portion to confine material on said belt until it reaches said discharge station.

10. An endless conveyor according to claim 1 wherein a transfer shoe is provided at the base of said elevating section, between said fixed plate and said second belt.

* * * * *